United States Patent

[11] 3,625,615

[72] Inventor  Raymond Wilson
              Heidenheim on the Brenz, Germany
[21] Appl. No. 23,571
[22] Filed    Mar. 30, 1970
[45] Patented Dec. 7, 1971
[73] Assignee Carl Zeiss-Stiftung
              Heidenheim on the Brenz, Wuerttemberg,
              Germany
[32] Priority Apr. 1, 1969
[33]          Germany
[31]          P 19 16 548.1

[54] A DEVICE FOR SPECTRAL DISPERSION OF LIGHT EMPLOYING A PREDISPERSION PRISM AND A GRAFTING MONOCHROMATOR
5 Claims, 5 Drawing Figs.

[52] U.S. Cl. .................................................. 356/99,
                                350/162 R, 350/168, 356/101
[51] Int. Cl. .................................................. G01j 3/12
[50] Field of Search .................................... 350/168,
                                 162 R; 356/99–101, 79, 51

[56]              References Cited
                UNITED STATES PATENTS
2,866,374  12/1958  Lewis et al. ................. 356/99
2,948,185  8/1960   Ward et al. ................. 356/101 X

OTHER REFERENCES

Echelle Spectrographs, Bausch & Lomb Catalog D-260, Rec'd in Patent Office Aug. 1955, pp. 4–13

Primary Examiner—David Schonberg
Assistant Examiner—Ronald J. Stern
Attorney—Singer, Stern and Carlberg ABSTRACT: A device for spectral dispersion of light, comprising a predispersion prism arranged ahead of a grating monochromator and in which the predispersion prism is constructed as an aplanatic prism having spherical faces, one of which is concentric to the first aplanatic point which is spaced from the center of curvature of the aplanatic refractive face and at whose place the entrance slit is arranged. The grating monochromator is provided with a concave diffraction screen on a Rowland circle on which is disposed not only the second aplanatic point but also the point in which the center ray of a limit beam of a predetermined aperture intersects the second aplanatic circle which is concentric to the center of curvature of the aplanatic refractive face.

A DEVICE FOR SPECTRAL DISPERSION OF LIGHT EMPLOYING A PREDISPERSION PRISM AND A GRAFTING MONOCHROMATOR

The invention relates to a device for spectral dispersion of light which comprises a prism serving as a predispersion element arranged ahead of a grating monochromator.

Devices of this type are known in which a stand prism is used as a predispersion element. These known devices have, however, the disadvantage that they are not very powerful and that their construction, owing to the required additional optical elements, is relatively expensive.

It is also known to provide a prism grating monochromator with a so-called Fery prism which serves as a predispersion element. Such a prism exhibits, however, coma and astigmatism, so that the imaging produced by such a prism is very faulty.

The object of the present invention is a device for spectral dispersion of light which comprises a prism serving as a predispersion element and a grating monochromator arranged after the same and which has the advantage of high power and has a compact inexpensive construction.

The device for spectral dispersion of light in accordance with the invention is distinguished by a prism which is constructed as an aplanatic prism having spherical faces and having a refractive index $n$ and whose first face is concentric to the first aplanatic point which has a distance $r_2/n$ from the center of curvature of the aplanatic refractive face having a radius $r_2$ and at whose place is arranged the entrance slit, while the grating monochromator is constructed as a concave diffraction screen on whose Rowland circle is arranged not only the second aplanatic point but also the point in which the center ray of the limit beam of a given aperture intersects the second aplanatic circle which is disposed concentric to the center of curvature of the aplanatic refractive face.

A light beam coming from the entrance slit and whose marginal ray passes through the prism at a point which is still far enough away from the point of total reflection for being used in a technical exploitation is here designated as a limit beam. In general, one can assume that the mentioned marginal ray has an inclination of about 75° to 80° with respect to the plane of the entrance slit.

The point of intersection of the center ray of this limit beam with the second aplanatic circle could for instance, be at the same time the point of rotation for the concave grating. This grating in this case is rotatably adjusted about this point by small angular amounts for the selection of the wave length. It is also possible to preform the spectral analysis by a rotation of the grating about another point and if necessary to perform also an additional slidable displacement.

The aplanatic prism used in the new device furnishes for the point disposed on the axis a faultless image. Coma and astigmatism of a spherical concave grating are not influenced by the prism. Therefore, it is of advantage to construct the concave grating as a toric grating. In this manner, it is possible to eliminate the astigmatism. By means of a sighted deviation from the aplanatic conditions it is also possible to compensate in the prism part the coma of the grating for the average wave length.

It is also possible to operate the new device in autocollimation in which an entrance and an outlet slit is arranged at the place of the first aplanatic point. Owing to the aplanatism and astigmatism correction, the separation of the entrance slit and outlet slit is possible without noticeable deterioration of the imaging.

If one operates the new device not in autocollimation, then the outlet slit is arranged on the Rowland circle of the concave grating. The Rowland circle does not at all have to be identical with the outer aplanatic circle. The necessary condition for the correct arrangement of the concave grating is solely that not only the second aplanatic point of the prism but also the point of intersection of the center ray of the limit beam has to lie with this point on the second aplanatic circle of the Rowland circle, so that the connection of these two points forms a chord of the Rowland circle. A tilted position of the grating in which this condition is maintained, makes it possible to operate without autocollimation and permits a convenient separation of the entrance slit and outlet slit. The entrance slit may, therefore, remain positioned correctly on the axis of the prism.

When operating within or outside of the autocollimation, it is possible and advantageous to arrange a second concave grating in rear of the outlet slit. One obtains then a grating monochrometer with two diffraction screens arranged in series.

In many cases, it is advisable to construct the concave grating as an Echelle grating, which is a grating which has a predetermined blaze angle. Such a grating with a small inclination may be operated in relative high orders. Such an arrangement is particularly suitable with respect to the compensation of coma and astigmatism.

A powerful prism grating monochromator is also then produced when the described aplanatic prism is arranged in rear of a powerful grating monochromator of known construction. In such a case, the prism is arranged in such a manner relative to the grating monochromator that the virtual image of the entrance slit of the predispersion prism forms the entrance slit of the grating monochromator. In such a case, one obtains a compact monochromator combination with a minimum of optical elements. The aplanatic prism disposed in rear of the grating monochromator may be constructed according to Czerney-Turner, Ebert-Fastie or other arrangements.

It may also be of advantage to employ as a predispersion element a prism combination which comprises a first aplanatic prism with spherical faces and having the refraction index $n_1$ and a second prism with spherical faces having a refraction index $n_2$, whereby the first face of the aplanatic prism is arranged concentrically to the first aplanatic point which has a distance $n_2/n_1 r_2$ from the center of curvature of the aplanatic refraction face having the radius $r_2$, whereby the first face of the second prism also has the radius $r_2$, while the second face is concentric to the second aplanatic point and comprises a mirror surface. The entrance and the outlet slits are disposed in this arrangement at the place of the first aplanatic point, and in the path of the light passing through the outlet inlet is arranged a concave diffraction screen. In this arrangement is also combined a predispersion prism furnishing an intermediate image with a concave grating.

The invention will now be described with reference to the accompanying drawings in which the FIGS. 1 to 5 illustrate each a different embodiment of the new device.

Figure 1:
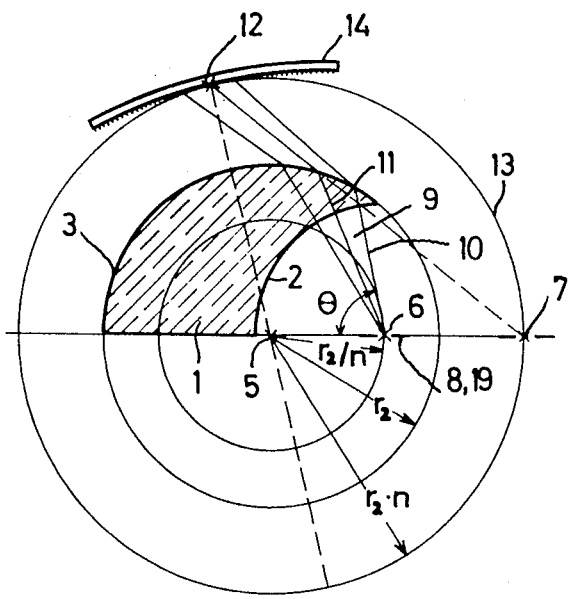
FIG. 1 illustrates by way of example a device comprising an aplanatic prism and a concave grating.

Referring to FIG. 1, an aplanatic prism 1 is provided with spherical faces 2 and 3 and consists of material having the refraction index $n$. The aplanatic refraction face 3 of this prism has the radius $r_2$. The center of curvature of this refraction face 3 is designated with 5. The aplanatic points of the face 3 are designated with 6 and 7. Since the refraction index of the medium which surrounds the prism 1 is $n = 1$, the first aplanatic point 6 has a distance $r_2/n$ from the center of curvature 5. The second aplanatic point 7 has the distance $r_2 \cdot n$ from the point 5.

The first mentioned spherical face 2 of the prism 1 is concentric to the first aplanatic point 6. At the place of this point is arranged the entrance slit 8.

A limit beam 9 which comes from the entrance slit 8 has a marginal ray 10 which in the illustrated embodiment of the device, forms an angle $\theta=80°$ with the plane of the entrance slit 8. This angle is given by the requirements that the marginal ray 10 has to be far enough away from the point of total reflection in order to insure a faultless operation of the device.

The limit beam 9 has a given aperture ratio. In the illustrated example, this aperture ratio is 1:3. The center ray of this limit mean 9 is designated with 11. This center ray 11 intersects the second aplanatic circle 13 of the aplanatic refraction face 3 which is concentric to the center of curvature 5 in the point 12. Since the circle 13 contains the point of intersection 12 and the second aplanatic point 7, the circle comprises the Rowland circle for a concave diffraction screen 14. The radius of curvature of this diffraction screen 14 is determined by the diameter of the circle 13.

The device illustrated in FIG. 1 operates in autocollimation. The light which is diffracted on the screen 14 is directed back through the prism 11 toward the aplanatic point 6 at the place of which is arranged the outlet slit 19. For selecting the wave length, one may, by way of example, rotatably adjust the diffraction screen 14 about the point 12 by small angular amounts. As already mentioned in the foregoing, there may be employed other types of spectral analysis.

The general requirement for the Rowland circle of the diffraction screen is that this circle contains not only the point of intersection 12 but also the second aplanatic point 7, that is, the distance between the points 7 to 12 forms the chord of the Rowland circle.

Figure 2:
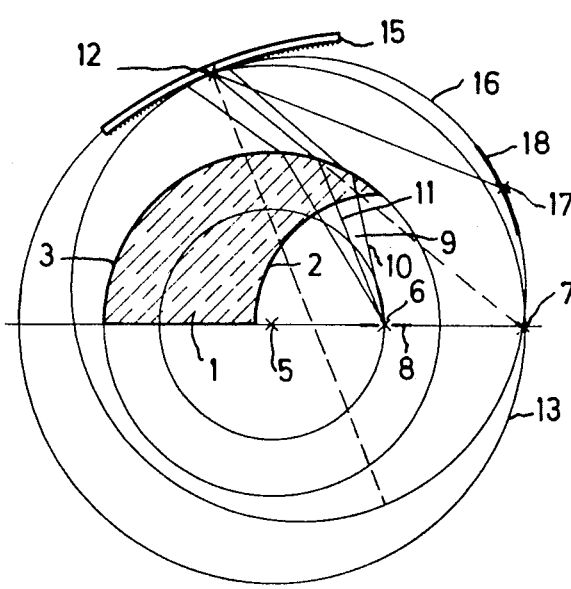
FIG. 2 illustrates by way of example a device which is distinguished over FIG. 1 by a concave grating having a different base inclination.

Referring now to the device illustrated in FIG. 2, it should be noted that the circle 13 does not form the Rowland circle of the diffraction screen. In this modified example of the invention, the Rowland circle of this modified example of the invention, the Rowland circle of the concave diffraction screen 15 is designated with 16. One realizes at once that the points 12 and 17 are positioned on the circle 16. In this modified device, the diffraction screen has a different base inclination to the plane of the entrance slit 8 than as shown in FIG. 1. Therefor, it is possible to obtain a desired direction of the diffraction by means of the screen without coming into conflict with the prism.

The device illustrated in FIG. 2 does not operate in autocollimation. The light diffracted on the screen 16 produces therefore an image of the entrance slit at the place 17 which is disposed on the Rowland circle 16. When employing this device as a spectrograph, one arranges a light sensitive film 18 on the Rowland circle 16.

Figure 3:
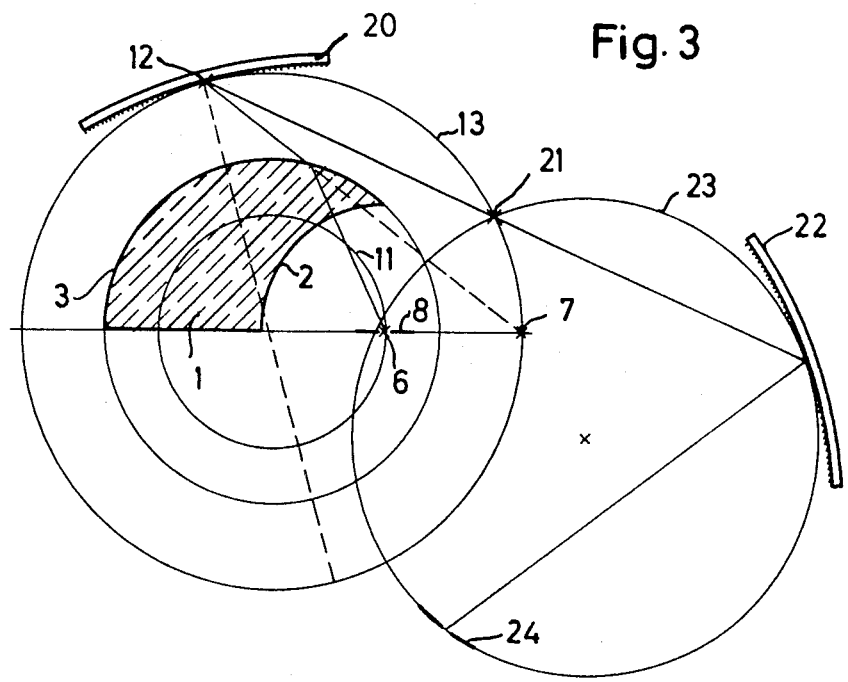
FIG. 3 illustrates an embodiment of the device in which a first concave grating is mounted ahead of a second concave grating.

FIG. 3 illustrates a device which with respect to the prism 1 and the diffraction screen 20 is constructed exactly as shown in FIG. 1 or 2. The device of FIG. 3 operates, however, not in autocollimation, so that an image of the entrance slit 8 appears at the place 21 which is arranged on the second aplanatic circle 13 which also forms the Rowland circle of the screen 20. In this case, the image is used as an intermediate image and the light transmitted by the latter is directed onto a second concave diffraction screen 22. The Rowland circle of this screen is designated with 23. The light coming from the diffraction screen 22 finally reaches the outlet slit 24.

The device as illustrated in FIG. 3 may also be constructed in such manner that the prism 1 and the diffraction screen 20 operate in autocollimation. In such a case, the second screen 22 must be so arranged that the light passing through the outlet slit located at the place of the first aplanatic point 6 will hit the second screen 22.

Figure 4:
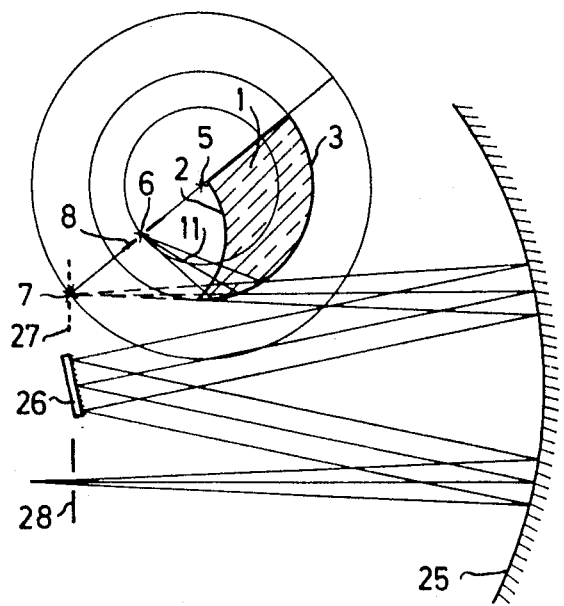
FIG. 4 illustrates an embodiment in which an aplanatic prism is employed as a predecomposition element and is combined with a powerful monochromator in an Ebert arrangement.

FIG. 4 illustrates a device in which the aplanatic prism 1 serves as a predispersion element of a powerful grating monochromator according to an Ebert arrangement. This grating monochromater consists of the concave mirror 25 and the diffraction screen 26. The prism 1 is arranged in such a manner that the virtual image of the entrance slit 8 forms the entrance slit 27 of the grating monochromator 25, 26. The outlet slit is designated with 28. One can learn from FIG. 4 that a very compact and simple device is produced which starting with the prism may be very powerful. Such a device is particularly significant when the grating monochromator, for instance, by employing a spherical mirror, may operate in a very powerful manner.

Figure 5:
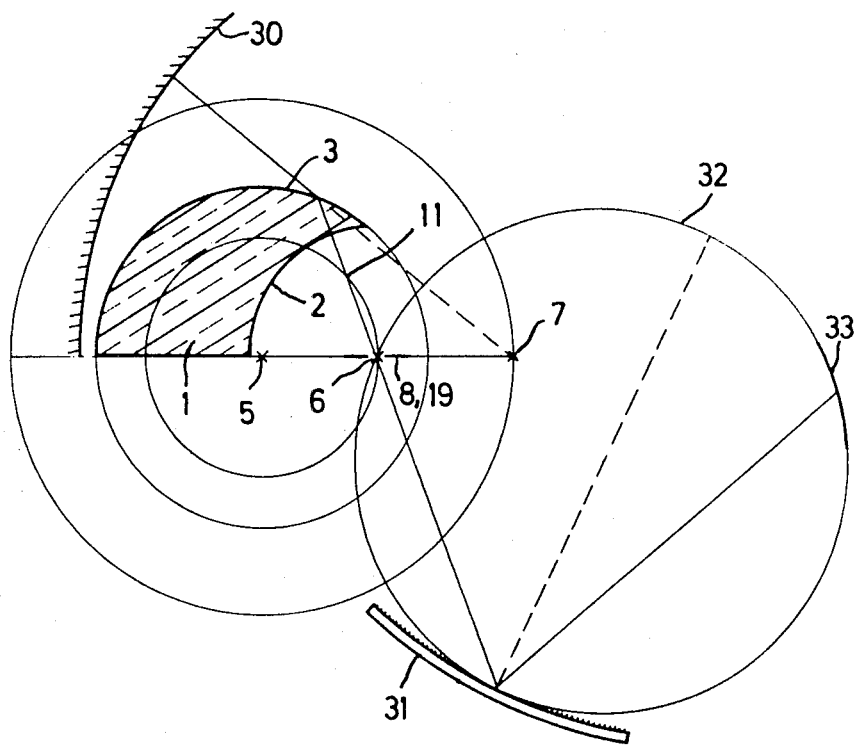
FIG. 5 illustrates an embodiment in which the predecomposition element comprises a combination of two prisms.

The embodiment of the device of the invention illustrated in FIG. 5 is provided with a prism predispersion element which comprises the combination of an aplanatic prism 1 and a second prism which has spherical faces. The latter in the present instance consists of an aerial prism having the faces 3 and 30. The face 30 is formed by a concave mirror whose face is concentric to the second aplanatic point 7.

The light reflected by the mirror 30 reaches the outlet slit 19 and produces there an intermediate image of the entrance slit 8. In the path of the light coming from the outlet slit 19 is arranged a concave diffraction screen 31 whose Rowland circle is designated with 32. On this circle is produced an image of the spectrum which may be recorded on a light-sensitive layer 33.

In place of the aerial prism 3, 30, one may also employ a solid prism which is combined with the prism 1. In such a case, the dispersions of the two prisms are directed oppositely and the prism 1 consists of a material having a higher index of refraction than the prism 2.

The device illustrated in the FIGS. 1 and 2, produces a spherically curved concave screen coma and astigmatism. The astigmatism may principally be eliminated by a toric grating, so that it is also advantageous to construct the diffraction screen 14 as a toric grating. By a sighted deviation from the aplanatic conditions, it is also possible to compensate the coma of the grating for the average wave length in the prism part. This sighted deviation from the aplanatic conditions consists in this, that the place of the entrance slit 8 no longer lies at the place of the first aplanatic point 6 but is displaced along the axis of the prism.

What is claimed is:

1. A device for spectral dispersion of light comprising a prism in combination with a grating monochromator and an exit slit, said prism serving as a predispersion prism and being constructed as an aplanatic prism having a refractive index $n$ and having a concave and a convex spherical surface, said convex surface having a radius $r$ and a first and a second aplanatic point, said first aplanatic point having a distance $r/n$ and said second aplanatic point having a distance $r \cdot n$ from the center of curvature of said convex surface, a first and second aplanatic circle being concentric to said center of curvature and passing through said first and second aplanatic point respectively, said concave surface being concentric to said first aplanatic point, an entrance slit being arranged at said first aplanatic point in such a manner that a light beam entering this slit passes undeflected through said concave surface into said prism, marginal rays of said light beam forming an angle of about 80° with the plane of said entrance slit, said grating monochromator being constructed as a concave diffraction grating which is so arranged that the light passing through said convex surface of said predispersion prism falls upon it and that said second aplanatic point as well as the point in which the center ray of said light beam intersects said second aplanatic circle are arranged on the Rowland circle of said grating.

2. A device according to claim 1, in which said concave diffraction grating is constructed as a toric grating.

3. A device according to claim 1, in which said concave diffraction grating is constructed as an Echelle grating.

4. A device according to claim 1, in which said exit slit (19) is arranged on the Rowland circle (16) of the concave diffraction grating(15).

5. A device according to claim 1, in which said exit slit (19) is arranged on the Rowland circle (16) of the concave diffraction grating (15), and including a second concave diffraction grating (22) arranged in rear of said exit slit.